UNITED STATES PATENT OFFICE.

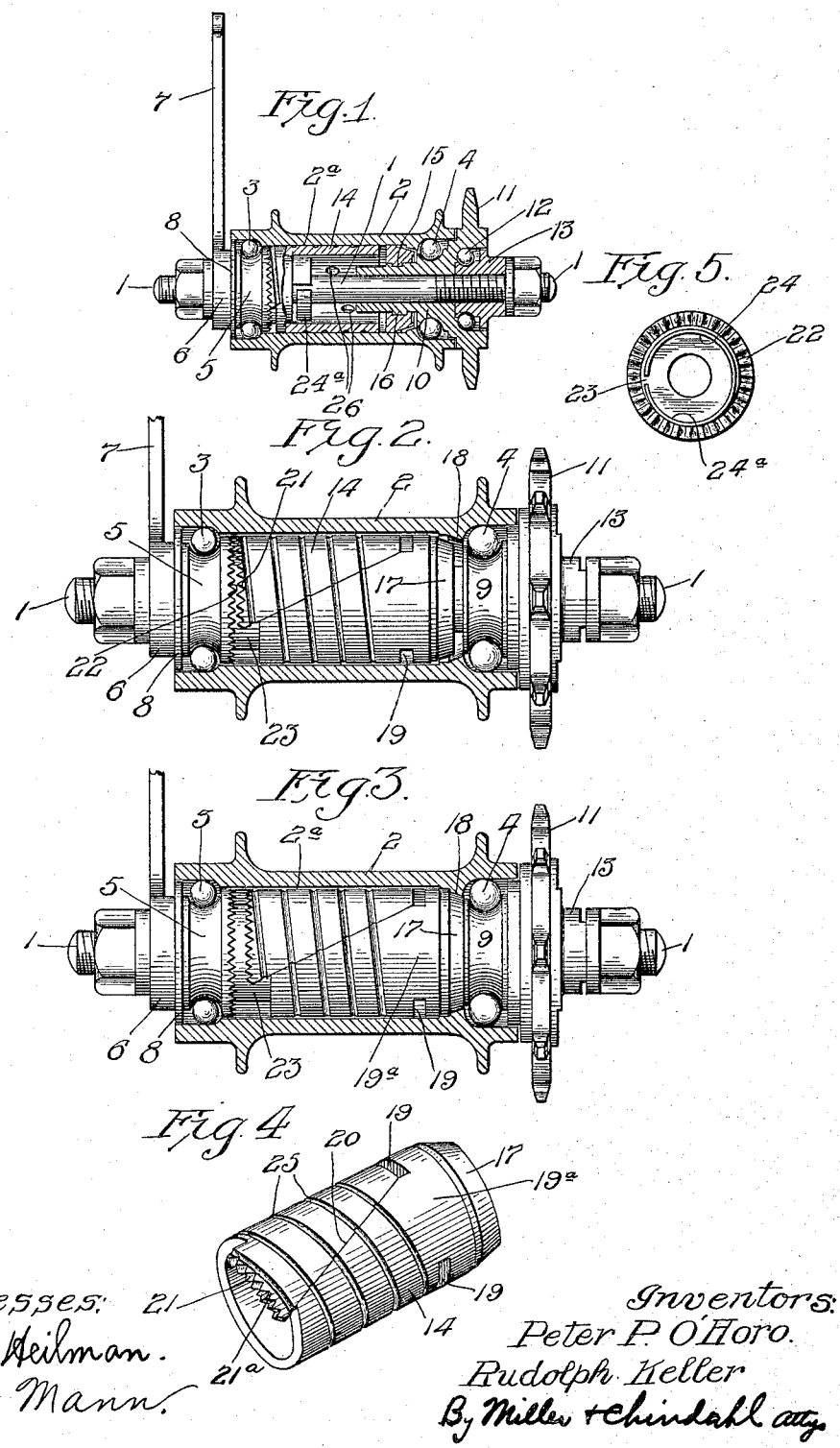

PETER P. O'HORO AND RUDOLPH KELLER, OF CHICAGO, ILLINOIS.

COASTER-BRAKE.

1,149,149.  Specification of Letters Patent.  Patented Aug. 3, 1915.

Application filed April 29, 1914. Serial No. 835,080.

*To all whom it may concern:*

Be it known that we, PETER P. O'HORO and RUDOLPH KELLER, citizens of the United States, residing at Chicago, in the county of Cook and State of Illinois, have invented certain new and useful Improvements in Coaster-Brakes, of which the following is a specification.

This invention relates to improvements in hubs for driving and braking bicycles and similar vehicles.

Among the objects of the invention are to reduce the number of parts, to obviate the necessity of providing braking surfaces of bronze or other metals different from that used in the general construction of the hub, and to provide a very powerful brake.

In the accompanying drawings, Figure 1 is a horizontal sectional view of a wheel hub embodying the features of our invention. The parts are shown in the braking position. Fig. 2 is a similar view but showing the parts in the free-running or coasting position. Fig. 3 is a view like those in Figs. 1 and 2, but showing the parts in the driving position. Fig. 4 is a perspective view of one of the elements of the mechanism. Fig. 5 is an inner side view of another element of the mechanism.

The embodiment herein shown of our invention comprises a fixed axle 1 adapted to be stationarily mounted in the rear fork of a bicycle frame.

2 is the cylindrical shell forming the hub, proper. The shell 2 is herein shown as supported upon bearing balls 3 and 4, the balls 3 being contained in a ball-race 5 formed in the periphery of a collar 6, said collar being rigidly mounted upon the axle 1. The collar 6 may be held against rotation by any suitable means, such as an arm 7 connected to said collar and adapted to be secured to an adjacent portion of the bicycle frame.

8 is an annular flange formed upon the periphery of the collar 6 and serving to exclude dust from the bearing.

The bearing balls 4 are contained in a ball-race 9 which is formed upon the hub 10 of the sprocket wheel 11. The sprocket wheel 11 is mounted concentric with the axle 1 and is supported upon a ball bearing 12, which is provided between the sprocket wheel and a bushing 13 fixed upon the axle.

The rotation of a shell 2 is controlled from the sprocket wheel 11 through the medium of a sleeve 14. The diameter of said sleeve is such that normally the sleeve is out of contact with the interior surface 2ª of the shell 2. One end of said sleeve is provided with an internal screw-thread 15 which engages a similar screw-thread 16 on the hub 10. The threaded end of the sleeve 14 is provided with an external annular tapered friction driving surface 17 adapted to coact with a similar surface 18 in the adjacent end of the shell 2. The end of the sleeve 14 which is provided with the thread 15 and the driving surface 17 is nearly severed from the body of the sleeve by a slot 19. The body of the shell is split by a diagonal cut 20. That end of the sleeve 14 which is opposite to the threaded and tapered end is provided with a plurality of V-shape locking teeth 21 adapted to engage a series of similar locking teeth 22 formed upon the inner end portion of the collar 6. The teeth 21 are formed upon a projecting flange 21ª. Said flange is located at one side of the cut 20. It will be noted by inspection of the drawing that the tapered and threaded part of the sleeve is connected to the body of the sleeve at the opposite side of the cut 20 by means of the neck 19ª.

The toothed end of the sleeve 14 rests upon a cylindrical extension 23 of the collar 6. Any suitable means may be provided to cause sufficient resistance to rotation of the sleeve 14, so that rotation of the sprocket wheel 11 shall cause endwise movement of the sleeve. Herein, we have shown a split ring 24 which may, if desired, be formed integral with the inner end of the extension 23, the free end 24ª of said ring having frictional contact with the interior of the sleeve 14.

The interior of the hub may be filled with lubricant. If desired, the periphery of the sleeve 14 may have grooves 25 as indicated, and holes 26 may be formed through the sleeve to permit the lubricant to be carried around the periphery of the sleeve.

The operation is as follows: When the sprocket wheel 11 is revolved in the forward direction, the screw-thread 16 causes the sleeve 14 to move toward the right, thereby bringing the surface 17 into driving contact with the surface 18, and thus causing the shell 2 and the sleeve 14 to revolve with the sprocket wheel 11. If the rider desires to coast, he holds the sprocket wheel 11 stationary, whereupon the sleeve 14 moves to the left and out of contact with the surface 18. The shell 2 then revolves freely. If the rider desires to brake the wheel, he revolves the sprocket wheel 11 rearwardly, thereby moving the sleeve 14 toward the left until the teeth 21 thereof are in engagement with the stationary teeth 22. As hereinbefore stated, the teeth 21 are at one side of the cut 20. Continuing pressure of the screw-thread 16 against the screw thread 15 causes the portion of the sleeve 14 at the opposite side of the cut 20 to move to the left, which movement, by reason of the diagonal direction of the cut, causes the sleeve 14 to expand into frictional contact with the interior surface 2$^a$ of the shell 2, thereby braking the shell. As soon as the backward pressure on the sprocket wheel is relieved, the resiliency of the metal of the sleeve 14 causes the sleeve to contract to its normal form and diameter.

It has been found that a powerful braking effect is obtained even although the shell 2 and the sleeve 14 are formed wholly of steel.

The apparatus herein disclosed contains but few parts, and hence is inexpensive to manufacture.

It will be noted that the controlling element 14 is expansible by axial compression, and that when compressed between the collar 6 and the screw-thread 16, said element expands into braking contact with the interior surface of the shell 2.

We claim as our invention:

1. A controlling element for a vehicle hub consisting of an expansible sleeve having a driving portion at one end, and a locking portion at the other end, said sleeve being internally screw-threaded at the driving end.

2. A controlling element for a vehicle hub consisting of a sleeve having a driving portion at one end, and a locking portion at the other end, said sleeve being divided by a slot into an end portion and a body portion connected by a neck, the body portion being diagonally split, the neck being at one side of the line of split, and the locking portion being at the other side of said line, said end portion being internally screw-threaded.

3. A driving and braking mechanism comprising an axle, a hub shell rotatable concentrically with the axle, a stationary locking element, a controlling element in the shell adapted to engage said locking element, said controlling element being expansible into braking contact with the shell, and a driving wheel mounted on the axle, and an operating connection between the wheel and the controlling element, said connection comprising an integral annular flange on said controlling element.

4. A driving and braking mechanism comprising an axle, a hub shell rotatable concentrically with the axle, a stationary locking element, a controlling element within the shell, said controlling element being expansible by axial compression, one end of said controlling element being adapted to engage the locking element and the other end of said controlling element having a driving surface adapted to engage a driving surface of the shell, and a driving wheel having a hub, said hub being threaded into said controlling element.

5. A driving and braking mechanism comprising an axle, a hub shell rotatable concentrically with the axle, a controlling element expansible by axial compression into contact with the interior surface of the shell, said controlling element having a driving surface adapted to coact with a driving surface of the shell, a sleeve mounted on said axle and threaded into said element, and a driving wheel fixed to said sleeve.

6. A driving and braking mechanism comprising an axle, a hub shell rotatable concentrically with the axle, a stationary locking element in the shell, a controlling element within the shell, said controlling element being expansible by axial compression, one end of said controlling element being adapted to engage the locking element and the other end of said controlling element having a driving surface adapted to engage a driving surface of the shell, a driving wheel having a hub, a screw-thread connection between the hub and one end of the controlling element, and a stationary support for the other end of the controlling element.

7. A driving and braking mechanism comprising a fixed axle, a collar fixed on the axle, a hub shell rotatable concentrically with the axle, a controlling element in the shell, said element being expansible by axial compression into braking contact with the shell, one end of said controlling element being adapted to engage the collar, and the other end of said element being adapted to frictionally engage a driving surface of the shell, and a driving sleeve mounted on said axle and threaded into said controlling element.

8. A driving and braking mechanism comprising a fixed axle, a collar fixed on the axle, a hub shell rotatable concentrically with the axle, said collar being grooved to provide a ball race, bearing balls in said ball race and supporting one end of the shell, a bushing fixed on the axle, a driving wheel arranged concentric with the axle, a ball bearing between the driving wheel and said bushing, said driving wheel having a hub, said hub being grooved to form a ball race, bearing balls in the last mentioned ball race and supporting the other end of said shell, a controlling element in said shell, said element consisting of a sleeve divided by a slot into an end portion and a body portion connected by a neck, the body portion being diagonally split, the neck being at one side of the line of split, locking teeth on one end of the sleeve at the other side of the line of split, locking teeth on the collar adapted to be engaged by the teeth on the sleeve, a frictional driving surface on said end portion adapted to engage a similar surface within the shell, a screw-thread connection between said end portion and the hub of the driving wheel, said collar having a cylindrical extension upon which the sleeve is rotatably supported, and a member attached to the collar adapted to frictionally engage the interior of the sleeve.

In testimony whereof we hereunto set our hands in the presence of two witnesses.

PETER P. O'HORO.
RUDOLPH KELLER.

In the presence of—
A. N. WALKER,
WM. CUDDY.

Copies of this patent may be obtained for five cents each, by addressing the "Commissioner of Patents, Washington, D. C."